(12) United States Patent
Shirai

(10) Patent No.: US 9,580,124 B2
(45) Date of Patent: Feb. 28, 2017

(54) BICYCLE SEATPOST ASSEMBLY

(71) Applicant: SHIMANO INC., Sakai (JP)

(72) Inventor: Toyoto Shirai, Sakai (JP)

(73) Assignee: SHIMANO INC., Sakai (JP)

( * ) Notice: Subject to any disclaimer, the term of this patent is extended or adjusted under 35 U.S.C. 154(b) by 493 days.

(21) Appl. No.: 14/175,301

(22) Filed: Feb. 7, 2014

(65) Prior Publication Data

US 2015/0225030 A1    Aug. 13, 2015

(51) Int. Cl.
*B62J 1/08*      (2006.01)
*B62K 19/36*   (2006.01)

(52) U.S. Cl.
CPC ............... *B62J 1/08* (2013.01); *B62K 19/36* (2013.01); *B62J 2001/085* (2013.01); *Y10T 403/20* (2015.01)

(58) Field of Classification Search
CPC ..... B62K 19/36; B62J 1/00; B62J 1/02; F16B 7/1409; Y10T 403/32516; Y10T 403/32467; Y10T 403/32475; Y10T 403/592; Y10T 403/20
See application file for complete search history.

(56) References Cited

U.S. PATENT DOCUMENTS

| 7,083,180 B2 | 8/2006 | Turner | |
|---|---|---|---|
| 8,246,065 B1 * | 8/2012 | Kodama | B62J 1/08 280/278 |
| 2005/0161576 A1 * | 7/2005 | Boehm | A47C 3/30 248/631 |
| 2009/0324327 A1 * | 12/2009 | McAndrews | B62J 1/08 403/409.1 |
| 2011/0248144 A1 * | 10/2011 | Lee | F16B 9/023 248/574 |
| 2012/0104810 A1 * | 5/2012 | Walsh | B62K 19/36 297/215.13 |
| 2013/0119634 A1 * | 5/2013 | Camp | B62J 1/08 280/287 |
| 2013/0138302 A1 | 5/2013 | Hara et al. | |

FOREIGN PATENT DOCUMENTS

EP           1927538 B1    4/2008

* cited by examiner

*Primary Examiner* — Jonathan Masinick
(74) *Attorney, Agent, or Firm* — Mori & Ward, LLP

(57) ABSTRACT

A bicycle seatpost assembly comprises a first cylinder, a second cylinder, a positioning structure, and a mechanical position informing structure. The second cylinder is configured to be telescopically received in the first cylinder. The positioning structure is configured to relatively position the first cylinder and the second cylinder such that a positional relationship between the first cylinder and the second cylinder is continuously adjustable within an adjustable position range of the bicycle seatpost assembly. The mechanical position informing structure is configured to inform a user that at least one of the first and second cylinders reaches a reference position. The reference position is defined between a maximum-length position and a minimum-length position of the adjustable position range.

21 Claims, 14 Drawing Sheets

BICYCLE SEATPOST ASSEMBLY

BACKGROUND OF THE INVENTION

Field of the Invention

The present invention relates to a bicycle seatpost assembly.

Discussion of the Background

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. One component that has been recently redesigned is a bicycle seatpost assembly.

SUMMARY OF THE INVENTION

In accordance with a first aspect of the present invention, a bicycle seatpost assembly comprises a first cylinder, a second cylinder, a positioning structure, and a mechanical position informing structure. The second cylinder is configured to be telescopically received in the first cylinder. The positioning structure is configured to relatively position the first cylinder and the second cylinder such that a positional relationship between the first cylinder and the second cylinder is continuously adjustable within an adjustable position range of the bicycle seatpost assembly. The mechanical position informing structure is configured to inform a user that at least one of the first and second cylinders reaches a reference position. The reference position is defined between a maximum-length position and a minimum-length position of the adjustable position range.

In accordance with a second aspect of the present invention, the bicycle seatpost assembly according to the first aspect is configured so that the mechanical position informing structure is configured to generate a physical notification to inform a user that at least one of the first and second cylinders reaches the reference position.

In accordance with a third aspect of the present invention, the bicycle seatpost assembly according to the second aspect is configured so that the mechanical position informing structure is configured to generate, as the physical notification, at least one of a change in resistance force against telescopic movement of the first cylinder and the second cylinder, and vibration in response to telescopic movement of the first cylinder and the second cylinder.

In accordance with a fourth aspect of the present invention, the bicycle seatpost assembly according to the third aspect is configured so that the positioning structure includes a biasing structure to generate a biasing force such that the first cylinder and the second cylinder are telescopically moved relative to each other.

In accordance with a fifth aspect of the present invention, the bicycle seatpost assembly according to the fourth aspect is configured so that the biasing structure includes a biasing chamber configured to be filled with a compressible fluid to generate the biasing force such that the first cylinder and the second cylinder are telescopically moved relative to each other.

In accordance with a sixth aspect of the present invention, the bicycle seatpost assembly according to the fourth aspect is configured so that the mechanical position informing structure is configured to generate the resistance force smaller than the biasing force not to prevent the first cylinder and the second cylinder from being telescopically moved relative to each other by the biasing force.

In accordance with a seventh aspect of the present invention, the bicycle seatpost assembly according to the third aspect is configured so that the first cylinder includes an inner peripheral surface defining an internal cavity in which the second cylinder is telescopically movable. The mechanical position informing structure includes a first informing portion and a second informing portion. The first informing portion is provided on an outer peripheral surface of the second cylinder in the internal cavity. The second informing portion is provided on the inner peripheral surface of the first cylinder. The first informing portion and the second informing portion are slidable with each other to generate at least one of the change in resistance force and the vibration.

In accordance with an eighth aspect of the present invention, the bicycle seatpost assembly according to the seventh aspect is configured so that the mechanical position informing structure includes a pressing member configured to elastically press one of the first and the second informing portions in a radial direction of the first cylinder.

In accordance with a ninth aspect of the present invention, the bicycle seatpost assembly according to the eighth aspect is configured so that the pressing member comprises a spring.

In accordance with a tenth aspect of the present invention, the bicycle seatpost assembly according to the eighth aspect is configured so that the one of the first and the second informing portions comprises a rolling element rotatably provided with respect to the first and second cylinders.

In accordance with an eleventh aspect of the present invention, the bicycle seatpost assembly according to the tenth aspect is configured so that at least one of the first and second cylinders includes a holding structure configured to removably hold the rolling element.

In accordance with a twelfth aspect of the present invention, the bicycle seatpost assembly according to the eleventh aspect is configured so that the holding structure includes holding portions each configured to removably hold the rolling element.

In accordance with a thirteenth aspect of the present invention, the bicycle seatpost assembly according to the eighth aspect is configured so that the other of the first and the second informing portions comprises a recess with which the one of the first and second informing portions elastically pressed by the pressing member mates when at least one of the first and second cylinders reaches the reference position.

In accordance with a fourteenth aspect of the present invention, the bicycle seatpost assembly according to the thirteenth aspect is configured so that the recess comprises a groove extending in a circumferential direction of the first cylinder.

In accordance with a fifteenth aspect of the present invention, the bicycle seatpost assembly according to the thirteenth aspect is configured so that one of the first and second cylinders includes a seat attachment portion to which a bicycle seat is to be attached. The second cylinder is configured to be telescopically movable relative to the first cylinder in an axial direction of the first cylinder. The recess is disposed on the inner peripheral surface of the first cylinder, the recess including a bottom portion, a first surface, and a second surface. The bottom portion is disposed at a farthest position in the recess from the inner peripheral surface of the first cylinder in a radial direction of the first cylinder. The first surface is provided closer to the seat attachment portion than the bottom portion in the axial direction. The second surface is provided farther from the seat attachment portion than the first surface in the axial direction. At least one of the first surface and the second surface is inclined with respect to the axial direction.

In accordance with a sixteenth aspect of the present invention, the bicycle seatpost assembly according to the fifteenth aspect is configured so that the first surface has a first end farthest from the bottom portion in the first surface. The second surface has a second end farthest from the bottom portion in the second surface. A distance between the bottom portion and the first end of the first surface in the axial direction is longer than a distance between the bottom portion and the second end of the second surface in the axial direction.

In accordance with a seventeenth aspect of the present invention, the bicycle seatpost assembly according to the eighth aspect is configured so that the other of the first and second informing portions comprises a protrusion configured to be slidable with the one of the first and second informing portions elastically pressed by the pressing member.

In accordance with an eighteenth aspect of the present invention, the bicycle seatpost assembly according to the seventeenth aspect is configured so that one of the first and second cylinders includes a seat attachment portion to which a bicycle seat is to be attached. The second cylinder is configured to be telescopically movable relative to the first cylinder in an axial direction of the first cylinder. The protrusion is disposed on the inner peripheral surface of the first cylinder. The protrusion includes a top portion, a first surface, and a second surface. The top portion is disposed at a farthest position in the protrusion from the inner peripheral surface of the first cylinder in a radial direction of the first cylinder. The first surface is provided closer to the seat attachment portion than the top portion in the axial direction. The second surface is provided farther from the seat attachment portion than the first surface in the axial direction. At least one of the first surface and the second surface is inclined with respect to the axial direction.

In accordance with a nineteenth aspect of the present invention, the bicycle seatpost assembly according to the eighteenth aspect is configured so that the first surface has a first end farthest from the top portion in the first surface. The second surface has a second end farthest from the top portion in the second surface. A distance between the top portion and the first end of the first surface in the axial direction is shorter than a distance between the top portion and the second end of the second surface in the axial direction.

In accordance with a twentieth aspect of the present invention, the bicycle seatpost assembly according to the first aspect is configured so that one of the first and second cylinders is configured to be telescopically movable relative to each other. The mechanical position informing structure is configured to inform a user that at least one of the first and second cylinders reaches an additional reference position. The additional reference position is defined between the maximum-length position and the minimum-length position and spaced apart from the reference position in the axial direction.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

Figure 1:
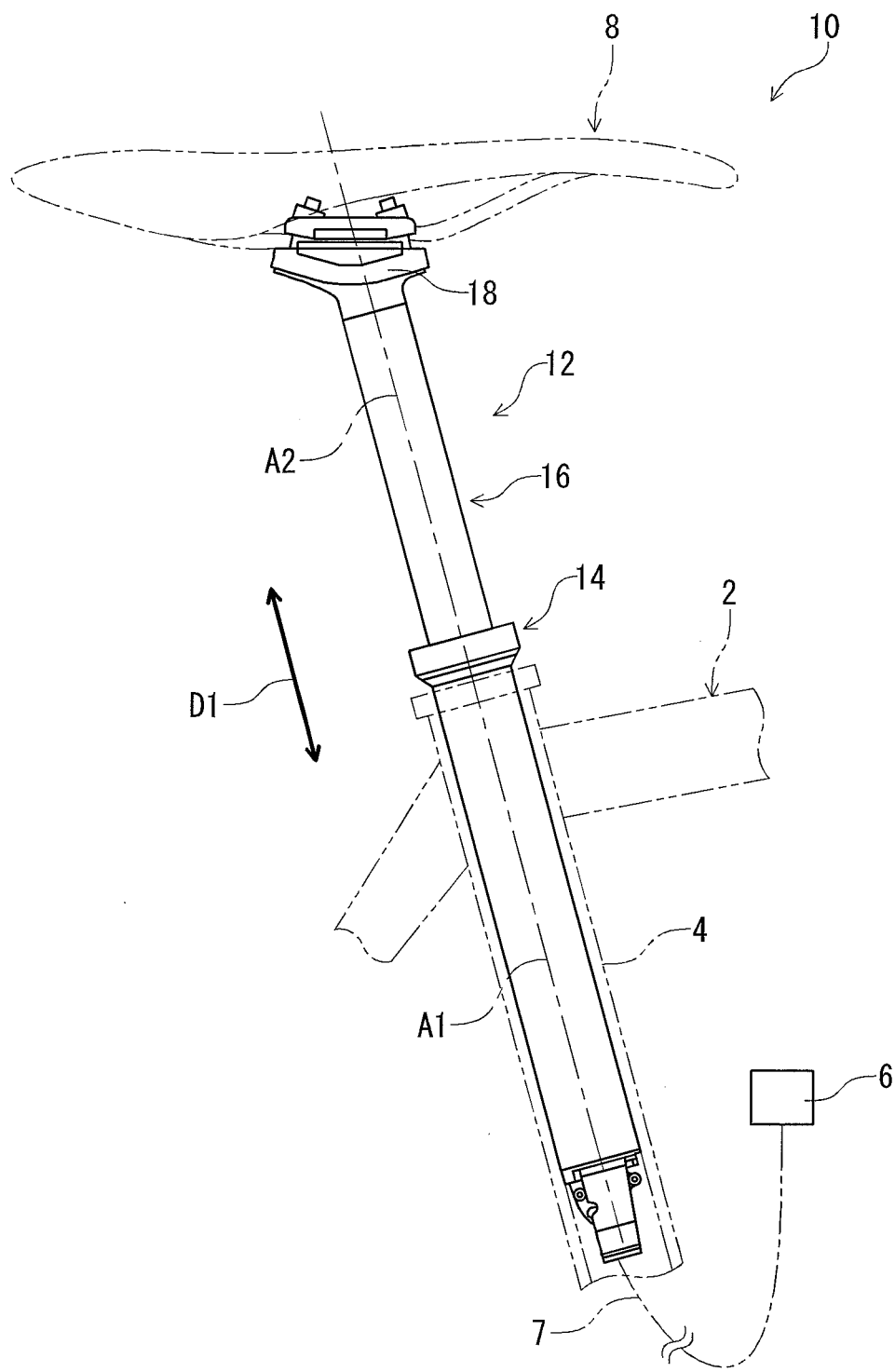
FIG. 1 is a side elevational view of a part of a bicycle equipped with a bicycle seatpost assembly in accordance with a first embodiment.

The embodiments will now be described with reference to the accompanying drawings, wherein like reference numerals designate corresponding or identical elements throughout the various drawings.

First Embodiment

Referring initially to FIG. 1, a part of a bicycle 10 is illustrated that is equipped with a bicycle seatpost assembly 12 in accordance with a first embodiment. The bicycle seatpost assembly 12 is detachably attached to a bicycle frame 2 of the bicycle 10. More specifically, the bicycle seatpost assembly 12 is detachably attached to a seat tube 4 of the bicycle frame 2. The bicycle seatpost assembly 12 is configured to be operated using an operating device 6. More specifically, the bicycle seatpost assembly 12 is connected to the operating device 6 via an operating wire 7. The operating device 6 is mounted to a handlebar (not shown) of the bicycle 10. Since the bicycle 10 includes structures which have been known in the bicycle field except for the bicycle seatpost assembly 12, they will not be described and/or illustrated in detail herein for the sake of brevity.

As seen in FIG. 1, the bicycle seatpost assembly 12 comprises a first cylinder 14 and a second cylinder 16. The first cylinder 14 is detachably attached to the seat tube 4 of the bicycle frame 2. The first cylinder 14 has a first center axis A1 and extends along the first center axis A1. The second cylinder 16 has a second center axis A2 and extends along the second center axis A2. The second center axis A2 is coaxial with the first center axis A1. The second cylinder 16 is configured to be telescopically received in the first cylinder 14. More specifically, the second cylinder 16 is configured to be telescopically movable relative to the first cylinder 14 in an axial direction D1 of the first cylinder 14. The axial direction D1 is defined to be parallel to the first center axis A1.

One of the first and second cylinders 14 and 16 includes a seat attachment portion to which a bicycle seat 8 is to be attached. In the illustrated embodiment, the second cylinder 16 includes a seat attachment portion 18 to which the bicycle seat 8 is to be attached. The seat attachment portion 18 is provided at an upper end of the second cylinder 16. The first cylinder 14 can, however, includes the seat attachment portion 18 in a case where the second cylinder 16 is detachably attached to the seat tube 4 of the bicycle frame 2.

In the present application, the following directional terms "front", "rear", "forward", "rearward", "left", "right", "transverse", "upward" and "downward" as well as any other similar directional terms refer to those directions which are determined on the basis of a rider who sits on the bicycle seat 8 of the bicycle 10 with facing the handlebar (not shown), for example. Accordingly, these terms, as utilized to describe the bicycle seatpost assembly 12 of the bicycle 10, should be interpreted relative to the bicycle 10 as used in an upright riding position on a horizontal surface.

Figure 2:
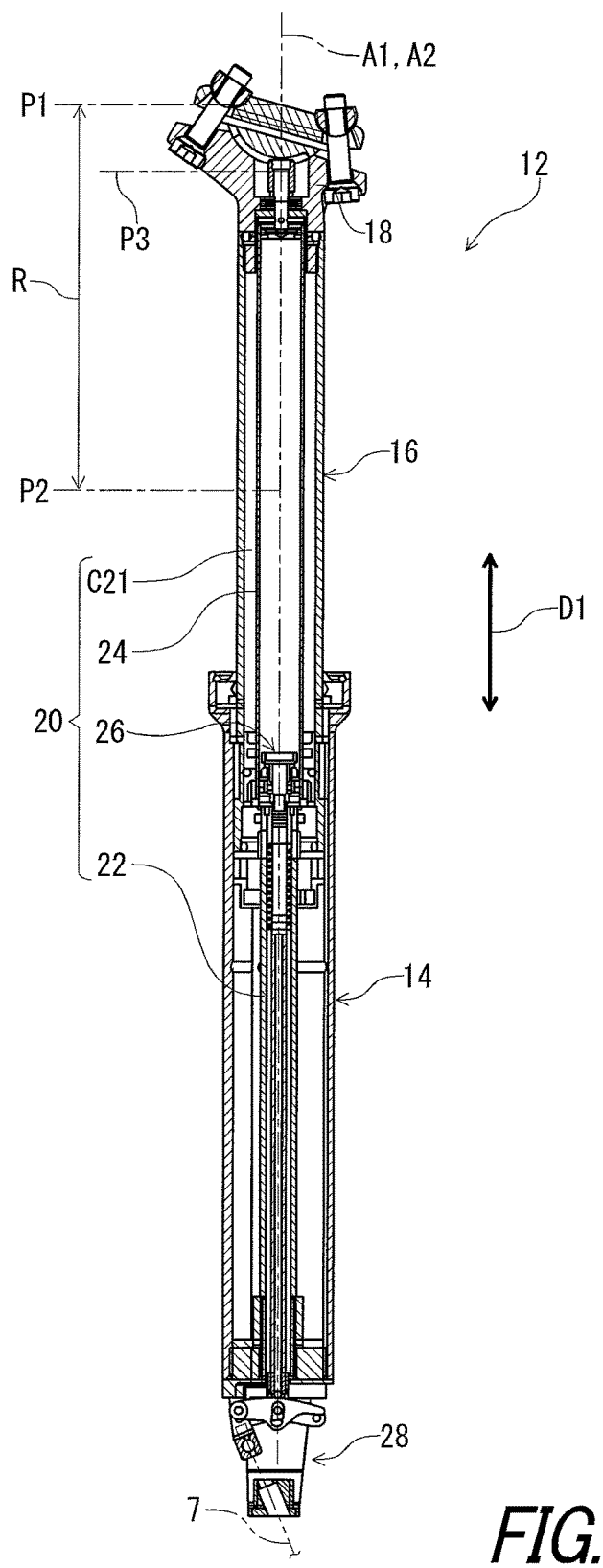
FIG. 2 is a cross-sectional view of the bicycle seatpost assembly illustrated in FIG. 1.

As seen in FIG. 2, the first cylinder 14 and the second cylinder 16 extend in the axial direction D1. The bicycle seatpost assembly 12 has an adjustable position range R defined from a maximum-length position P1 to a minimum-length position P2. In FIG. 2, the maximum-length position P1 and the minimum-length position P2 are defined with reference to a position of the seat attachment portion 18 relative to the first cylinder 14. The maximum-length position P1 and the minimum-length position P2 can, however, be defined with reference to portions other than the seat attachment portion 18. The maximum-length position P1 corresponds to a highest seat position of the bicycle seat 8. The minimum-length position P2 corresponds to a lowest seat position of the bicycle seat 8. The first cylinder 14 and the second cylinder 16 are movable relative to each other in the axial direction D1 within the adjustable position range R. The bicycle seatpost assembly 12 comprises a positioning structure 20. The positioning structure 20 is configured to relatively position the first cylinder 14 and the second cylinder 16 such that a positional relationship between the first cylinder 14 and the second cylinder 16 is continuously adjustable within the adjustable position range R of the bicycle seatpost assembly 12.

The positioning structure 20 includes a first inner tube 22, a second inner tube 24, and a valve structure 26. The first inner tube 22 and the second inner tube 24 extend in the axial direction D1. The first inner tube 22 is provided in the first cylinder 14. The second inner tube 24 is provided in the second cylinder 16. The valve structure 26 is configured to switch a state of the bicycle seatpost assembly 12 between an adjustable state and a locked state. In the adjustable state, the first cylinder 14 and the second cylinder 16 are telescopically movable relative to each other in the axial direction D1. In the locked state, the first cylinder 14 and the second cylinder 16 are fixedly positioned relative to each other in the axial direction D1. The bicycle seatpost assembly 12 includes a valve operating structure 28 attached to a lower end of the first cylinder 14. The valve operating structure 28 is operatively connected to the operating device 6 (FIG. 1) via the operating wire 7.

The positioning structure 20 includes a biasing structure to generate a biasing force such that the first cylinder 14 and the second cylinder 16 are telescopically moved relative to each other. In the illustrated embodiment, the biasing structure includes a biasing chamber C21 configured to be filled with a compressible fluid to generate the biasing force such that the first cylinder 14 and the second cylinder 16 are telescopically moved relative to each other. More specifically, the biasing chamber C21 is configured to generate the biasing force such that the first cylinder 14 and the second cylinder 16 are telescopically moved away from each other. Namely, the biasing chamber C21 is configured to generate the biasing force such that a total length of the bicycle seatpost assembly 12 increases. In the illustrated embodiment, the compressible fluid is applied to the biasing structure of the positioning structure 20; however, other biasing structures such as a spring can be applied in addition to or instead of the compressible fluid.

Figure 3:
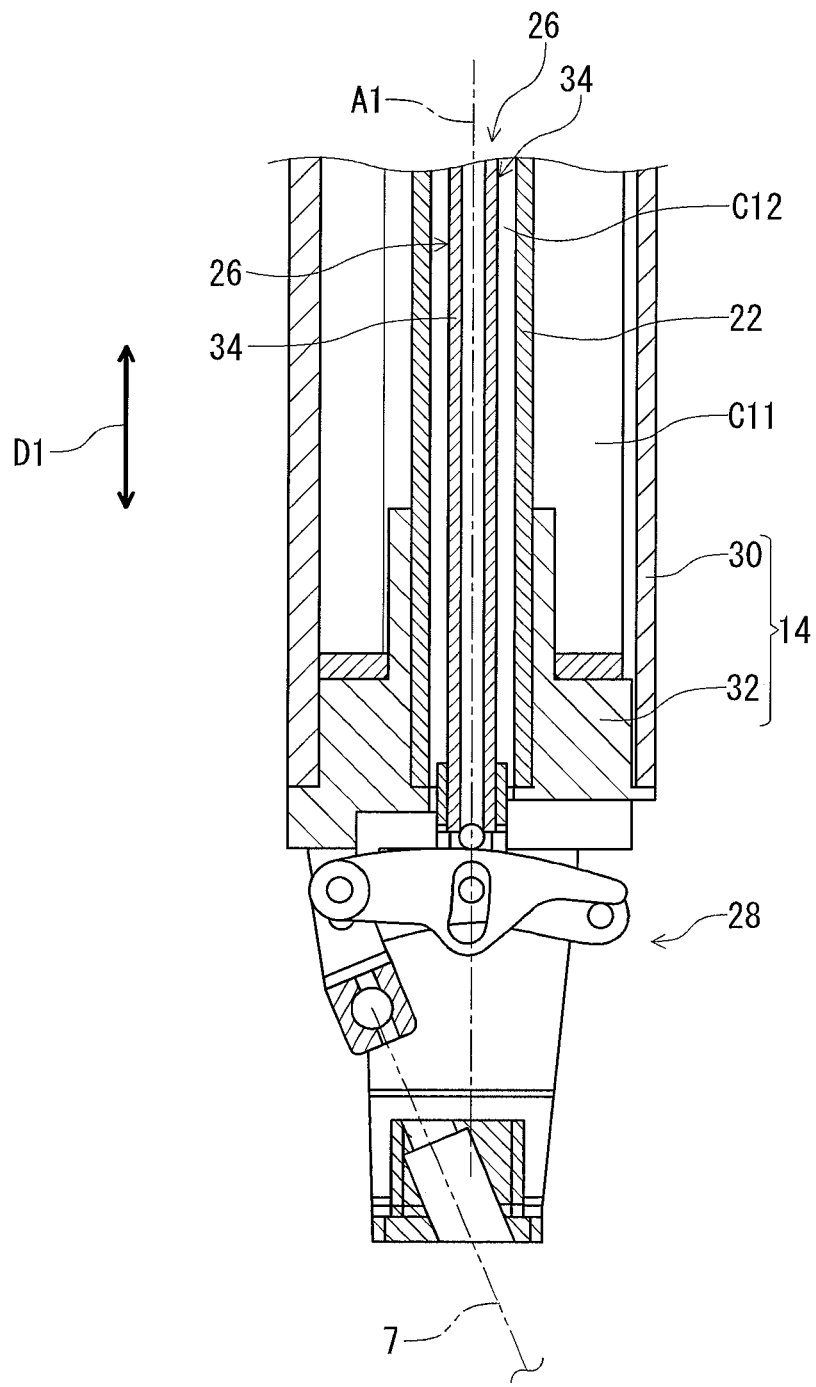
FIG. 3 is a partial enlarged cross-sectional view of the bicycle seatpost assembly illustrated in FIG. 1.

As seen in FIG. 3, the first cylinder 14 includes a first outer tube 30 and an end member 32 secured to a lower end of the first outer tube 30. The valve operating structure 28 is attached to the end member 32. A first outer chamber C11 is defined by the first outer tube 30, the first inner tube 22 and the end member 32. A first inner chamber C12 is defined by the first inner tube 22 and the end member 32. The first outer chamber C11 and the first inner chamber C12 are filled with a compressible fluid (e.g., air). A valve member 34 of the valve structure 26 is provided in the first inner tube 22 and is operatively coupled to the valve operating structure 28. The valve operating structure 28 is configured to move the valve member 34 relative to the first cylinder 14 in the axial direction D1 in response to movement of the operating wire 7.

Figure 4:
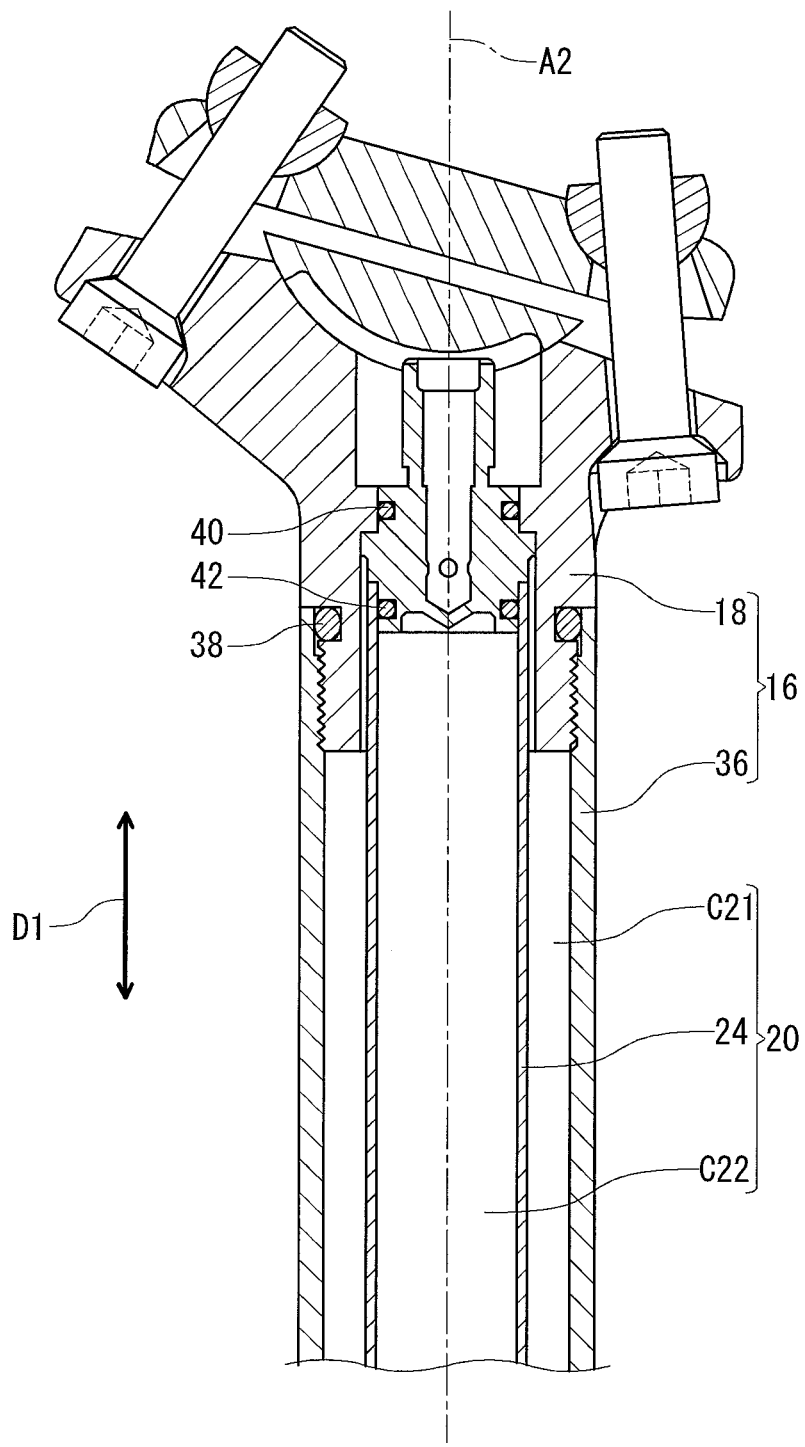
FIG. 4 is a partial enlarged cross-sectional view of the bicycle seatpost assembly illustrated in FIG. 1.

As seen in FIG. 4, the second cylinder 16 includes the seat attachment portion 18 and a second outer tube 36. The seat attachment portion 18 is attached to an upper end of the second outer tube 36. An upper end of the second inner tube 24 is attached to the seat attachment portion 18. The biasing chamber C21 of the positioning structure 20 is defined by the second outer tube 36, the second inner tube 24 and the seat attachment portion 18. A second inner chamber C22 is defined by the second inner tube 24 and the seat attachment portion 18. The biasing chamber C21 is filled with a compressible fluid (e.g., air). The second inner chamber C22 is filled with a substantially incompressible fluid (e.g. oil). An upper part of the biasing chamber C21 is sealed with a first seal member 38 and a second seal member 40. An upper part of the second inner chamber C22 is sealed with the second seal member 40 and a third seal member 42.

Figure 5:
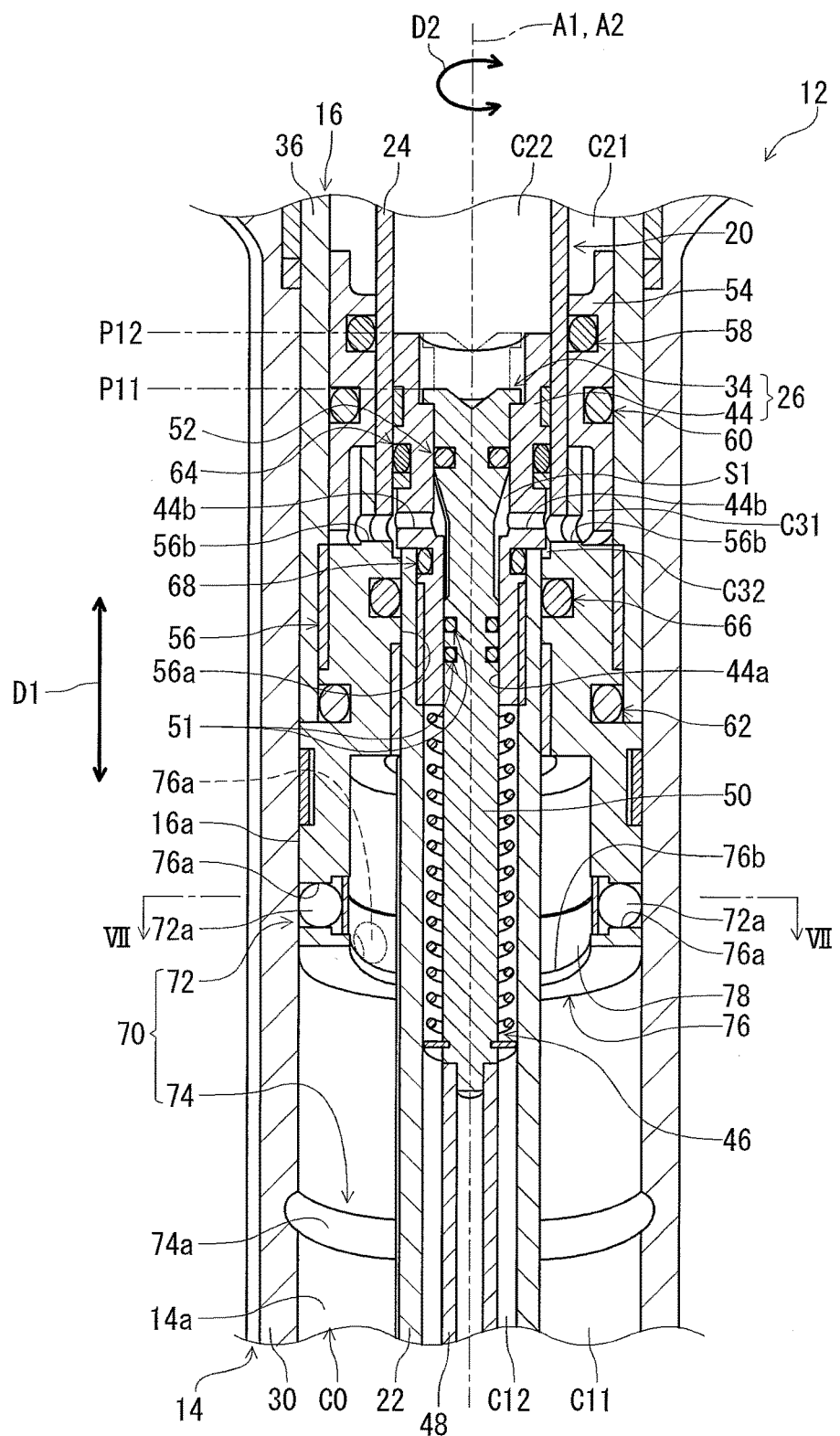
FIG. 5 is a partial enlarged cross-sectional view of the bicycle seatpost assembly illustrated in FIG. 1 (a maximum-length position)

As seen in FIG. 5, the valve structure 26 includes the valve member 34, a base member 44 and a biasing member 46. The valve member 34 includes a tube part 48 and a valve body 50. The valve body 50 is secured to an upper end of the tube part 48. The base member 44 is secured to an upper end of the first inner tube 22. The base member 44 includes a valve hole 44a. The valve body 50 slidably extends through the valve hole 44a and is movable relative to the base member 44 in the axial direction D1. The valve member 34 is movable relative to the base member 44 in the axial direction D1 between a closed position P11 and an open position P12.

A lower part of the second inner chamber C22 and an upper part of the first inner chamber C12 are sealed therebetween with seal members 51. An intermediate space S1 is defined by the valve body 50 and the base member 44. The intermediate space S1 and the second inner chamber C22 are sealed therebetween with a seal member 52 in a state where the valve member 34 is disposed at the closed position P11. The intermediate space S1 and the second inner chamber C22 are in communication with each other in a state where the valve member 34 is disposed at the open position P12. The intermediate space 51 is filled with a substantially incompressible fluid (e.g. oil). The biasing member 46 is provided in the first inner tube 22. The biasing member 46 biases the valve member 34 to the closed position P11 relative to the base member 44.

Figure 6:
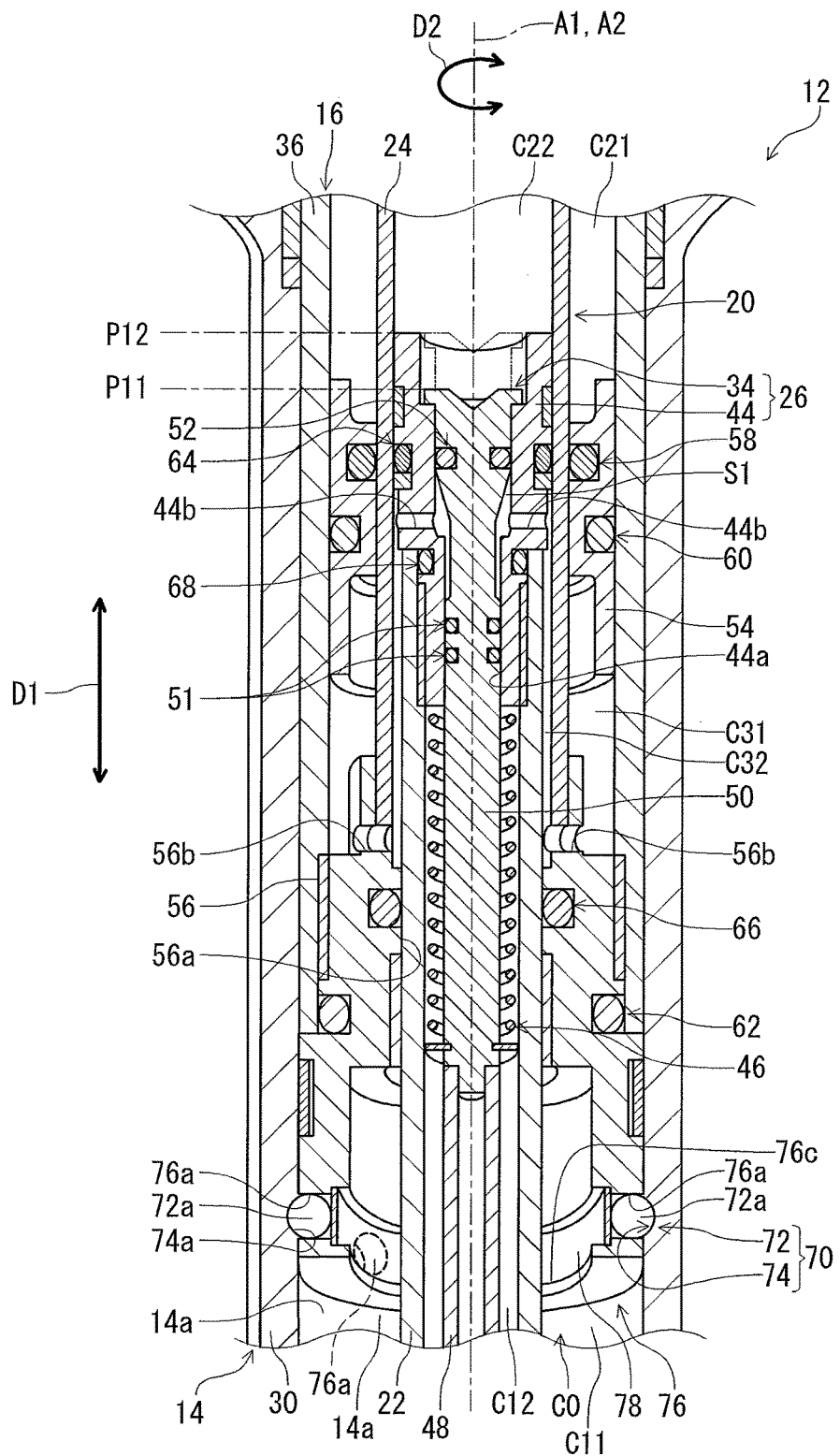
FIG. 6 is a partial enlarged cross-sectional view of the bicycle seatpost assembly illustrated in FIG. 1 (a reference position)

As seen in FIGS. 5 and 6, the positioning structure 20 includes a movable member 54. The movable member 54 is movably provided in the biasing chamber C21. The movable member 54 is provided between the second outer tube 36 and the second inner tube 24. A lower part of the biasing chamber C21 is sealed with the movable member 54. The biasing chamber C21 is defined by the second outer tube 36, the second inner tube 24, the movable member 54 and the seat attachment portion 18 (FIG. 4).

As seen in FIGS. 5 and 6, the second cylinder 16 further includes a sealing structure 56 attached to a lower end of the second outer tube 36. A lower end of the second inner tube 24 is attached to the sealing structure 56. The sealing structure 56 includes a center opening 56a extending in the axial direction D1. The first inner tube 22 slidably extends through the center opening 56a in the axial direction D1. The sealing structure 56 further includes first through-holes 56b which respectively extend in directions perpendicular to the first center axis A1 (or the second center axis A2). The first through-holes 56b are spaced apart from each other in a circumferential direction D2 of the first cylinder 14. The base member 44 includes second through-holes 44b which respectively extend in directions perpendicular to the first center axis A1 (or the second center axis A2). The second through-holes 44b are spaced apart from each other in the circumferential direction D2 of the first cylinder 14.

As seen in FIG. 6, a first intermediate chamber C31 is defined by the sealing structure 56, the second outer tube 36, the second inner tube 24 and the movable member 54. A second intermediate chamber C32 is defined by the second inner tube 24, the first inner tube 22, the base member 44 and the sealing structure 56. An upper part of the first intermediate chamber C31 and the lower part of the biasing chamber C21 are sealed therebetween with seal members 58 and 60. A lower part of the first intermediate chamber C31 and an upper part of the first outer chamber C11 are sealed therebetween with a seal member 62. An upper part of the second intermediate chamber C32 and a lower part of the second inner chamber C22 are sealed therebetween with a seal member 64. A lower part of the second intermediate chamber C32 and the upper part of the first outer chamber C11 are sealed therebetween a seal member 66. The second intermediate chamber C32 and the first inner chamber C12 are sealed therebetween with a seal member 68. The first intermediate chamber C31 and the second intermediate chamber C32 are filled with a substantially incompressible fluid (e.g. oil).

The second intermediate chamber C32 is in communication with the first intermediate chamber C31 via the first through-holes 56b. The second intermediate chamber C32 is in communication with the intermediate space S1 via the second through-holes 44b. Namely, the first intermediate chamber C31 is in communication with the intermediate space Si via the first through-holes 56b, the second intermediate chamber C32 and the second through-holes 44b.

As seen in FIGS. 5 and 6, the bicycle seatpost assembly 12 comprises a mechanical position informing structure 70. The mechanical position informing structure 70 is configured to inform a user (e.g., a rider) that at least one of the first and second cylinders 14 and 16 reaches a reference position P3 (FIG. 2), the reference position P3 being defined as a position of the seat attachment portion 18 relative to the first cylinder 14 in the illustrated embodiment. FIG. 6 illustrates a state in which the first and second cylinders 14 and 16 are positioned at the reference position P3. As seen in FIG. 2, the reference position P3 is defined between the maximum-length position P1 and the minimum-length position P2 of the adjustable position range R. The reference position P3 is defined as a position different from each of the maximum-length position P1 and the minimum-length position P2.

As seen in FIGS. 5 and 6, the mechanical position informing structure 70 is configured to generate a physical notification to inform a user that at least one of the first and second cylinders 14 and 16 reaches the reference position P3. Possible examples of the physical notification include vibration, a change in resistance force, and sound (e.g., click) caused by the vibration and/or the change in the resistance force. The mechanical position informing structure 70 is configured to generate, as the physical notification, at least one of a change in resistance force against telescopic movement of the first cylinder 14 and the second cylinder 16, and vibration in response to telescopic movement of the first cylinder 14 and the second cylinder 16.

In the illustrated embodiment, the mechanical position informing structure 70 is configured to generate, as the physical notification, vibration and/or the change in the resistance force. The mechanical position informing structure 70 is configured to generate the resistance force smaller than the biasing force (generated by the biasing chamber C21) not to prevent the first cylinder 14 and the second cylinder 16 from being telescopically moved relative to each other by the biasing force.

As seen in FIGS. 5 and 6, the mechanical position informing structure 70 includes a first informing portion 72 and a second informing portion 74. The first cylinder 14 includes an inner peripheral surface 14a defining an internal cavity CO in which the second cylinder 16 is telescopically movable. The first informing portion 72 is provided on an outer peripheral surface 16a of the second cylinder 16 in the internal cavity CO. The second informing portion 74 is provided on the inner peripheral surface 14a of the first cylinder 14. The first informing portion 72 and the second informing portion 74 are slidable with each other to generate at least one of the change in resistance force and the vibration.

More specifically, the one of the first and the second informing portions 72 and 74 comprises a rolling element rotatably provided with respect to the first and second cylinders 14 and 16. The other of the first and the second informing portions 72 and 74 comprises a recess with which the one of the first and second informing portions 72 and 74 elastically pressed by a pressing member 78 (described later) mates when at least one of the first and second cylinders 14 and 16 reaches at the reference position P3. In the illustrated embodiment, the first informing portion 72 comprises rolling elements 72a (e.g., balls) rotatably provided with respect to the first and second cylinders 14 and 16, the first informing portion configured to move together with the second cylinder 16 with respect to the first cylinder 14. The second informing portion 74 comprises a recess 74a with which the first informing portion 72 (the rolling elements 72a) elastically pressed by the pressing member 78 mates when at least one of the first and second cylinders 14 and 16 reaches at the reference position P3. The rolling elements 72a are arranged and spaced apart from each other in the circumferential direction D2. In the illustrated embodiment, the first informing portion 72 includes the rolling elements 72a; however, the first informing portion 72 can comprise a rolling element rotatably provided with respect to the first and second cylinders 14 and 16. Furthermore, the first informing portion 72 can include a recess provided on the second cylinder 16, and the second informing portion 74 can include a rolling element provided on the first cylinder 14.

FIGS. 5 and 6, at least one of the first and second cylinders 14 and 16 includes a holding structure configured to removably hold the rolling element. In the illustrated embodiment, the second cylinder 16 includes a holding structure 76 configured to removably hold the rolling elements 72a. The holding structure 76 is provided at a lower end of the second cylinder 16. More specifically, the holding structure 76 is provided at a lower end of the sealing structure 56. The holding structure 76 includes holding portions 76a each configured to removably hold the rolling element 72a.

Figure 7:
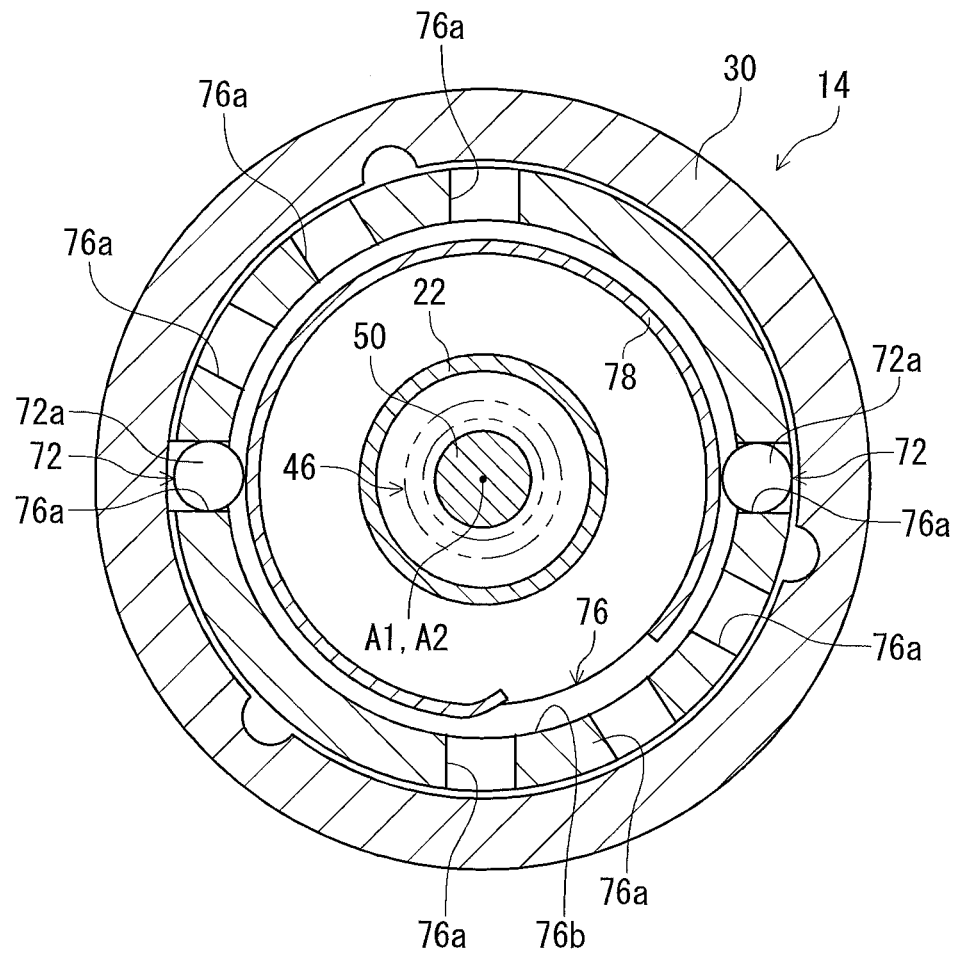
FIG. 7 is a cross-sectional view of the bicycle seatpost assembly taken along line VII-VII of FIG. 5.

As seen in FIG. 7, two of the holding portions 76a removably hold the rolling elements 72a. A total number of the holding portions 76a is equal to or greater than a total numbers of the rolling elements 72a. The holding portions 76a include through-holes extending in radial directions of the bicycle seatpost assembly 12. The radial directions are perpendicular to the first center axis A1 (or the second center axis A2). The rolling elements 72a are rotatably provided in the holding portions 76a. The holding portions 76a are further configured to movably hold the rolling elements 72a relative to the holding structure 76 in the radial directions of the bicycle seatpost assembly 12.

FIGS. 5 to 7, the mechanical position informing structure 70 includes the pressing member 78 configured to elastically press one of the first and the second informing portions 72 and 74 in the radial direction of the first cylinder 14. The pressing member 78 comprises a spring. More specifically, the pressing member 78 comprises a curved leaf spring. The pressing member 78 is disposed along an inner periphery of the holding structure 76. The holding structure 76 includes a holding groove 76b provided on the inner periphery of the holding structure 76. The holding groove 76b has an annular shape. The holding portions 76a are arranged and spaced apart from each other along the holding groove 76b. The pressing member 78 is disposed in the holding groove 76b and is elastically deformed in the radial direction of the first cylinder 14. The pressing member 78 radially outward presses the rolling elements 72a against the inner peripheral surface 14a of the first cylinder 14. The pressing member 78 can have structures other than a spring.

FIGS. 5 and 6, the recess 74a comprises a groove extending in a circumferential direction D2 of the first cylinder 14. The recess 74a is disposed on the inner peripheral surface 14a of the first cylinder 14. The recess 74a has an annular shape along the inner peripheral surface 14a of the first cylinder 14. The recess 74a has an arc cross-section and has a radius of curvature substantially the same as a radius of each of the rolling elements 72a. Each of the rolling elements 72a can be partially fitted in the recess 74a when at least one of the first and second cylinders 14 and 16 reaches at the reference position P3. Since a depth of the recess 74a is smaller than a radius of each of the rolling elements 72a, the rolling elements 72a and the recess 74a do not prevent the first and second cylinders 14 and 16 from moving relative to each other in the axial direction D1 over the reference position P3. Namely, the mechanical position informing structure 70 does not prevent the user from adjusting a position of the bicycle seat 8 (FIG. 1) within the adjustable position range R.

Referring to FIGS. 5 and 6, the operation of the bicycle seatpost assembly 12 will be described. When the user operates the operating device 6 to pull the operating wire 7 (FIG. 1), the valve member 34 is moved relative to the base member 44 from the closed position P11 to the open position P12. This allows the second inner chamber C22 to be in communication with the first intermediate chamber C31 via the intermediate space S1, the second through-holes 44b, the second intermediate chamber C32 and the first through-holes 56b. In a state where the user seats on the bicycle seat 8 attached to the seat attachment portion 18, the user's weight is applied from the bicycle seat 8 to the bicycle seatpost assembly 12. The rider's weight downwardly moves the second cylinder 16 relative to the first cylinder 14 in the axial direction D1. This causes the substantially incompressible fluid in the second inner chamber C22 to flow from the second inner chamber C22 to the first intermediate chamber C31 through the intermediate space S1, the second through-holes 44b, the second intermediate chamber C32 and the first through-holes 56b. The substantially incompressible fluid flowing into the first intermediate chamber C31 pushes up the movable member 54 relative to the second cylinder 16 in the axial direction D1, This causes the compressible fluid in the biasing chamber C21 to be compressed to generate the biasing force such that the first and second cylinders 14 and 16 move away from each other in the axial direction D1. The user's weight downwardly moves the second cylinder 16 relative to the first cylinder 14 against the biasing force generated in the biasing chamber C21.

As seen in FIG. 6, when at least one of the first and second cylinders 14 and 16 reaches the reference position P3, each of the rolling elements 72a is instantaneously partially fitted in the recess 74a with the pressing force of the pressing member 78 and exits the recess 74a. This causes vibration and/or a change in resistance force to be generated when at least one of the first and second cylinders 14 and 16 reaches the reference position P3. Sound such as click can be generated by the vibration and the change in the resistance force. The generated vibration can be transmitted to the user through the second cylinder 16 and the bicycle seat 8, informing the user that at least one of the first and second cylinders 14 and 16 reaches the reference position P3. The change in the resistance force can instantaneously change the telescopic movement of the first and second cylinders 14 and 16, informing the user that at least one of the first and second cylinders 14 and 16 reaches the reference position P3. The generated sound can reach the user's ears, informing the user that at least one of the first and second cylinders 14 and 16 reaches the reference position P3.

When the user operates the operating device 6 to release the operating wire 7 (FIG. 1), the valve member 34 is moved from the open position P12 to the closed position P11, preventing the substantially incompressible fluid from flowing from the second inner chamber C22 to the first intermediate chamber C31. This stops the relative axial movement of the first and second cylinders 14 and 16, positioning fixedly the first and second cylinders 14 and 16 relative to each other in the axial direction D1.

When the user operates the operating device 6 to pull the operating wire 7 (FIG. 1) in a state where the user's weight is not applied to the bicycle seat 8, the biasing force in the biasing chamber C21 pushes down the movable member 54 relative to the second cylinder 16, causing the substantially incompressible fluid to flow from the first intermediate chamber C31 to the second inner chamber C22 via the first through-holes 56a, the second intermediate chamber C32, the second through-holes 44a and the intermediate space S1. This upwardly moves the second cylinder 16 relative to the first cylinder 14 in the axial direction D1. Namely, the biasing force in the biasing chamber C21 pushes up the second cylinder 16 relative to the first cylinder 14 in the axial direction. When at least one of the first and second cylinders 14 and 16 reaches the reference position P3, the resistance force is generated by the mechanical position informing structure 70. Since the resistance force generated by the mechanical position informing structure 70 is smaller than the biasing force generated by the biasing chamber C21, the first cylinder 14 and the second cylinder 16 are not prevented from telescopically moving relative to each other with the biasing force generated in the biasing chamber C21.

With the bicycle seatpost assembly 12, since the mechanical position informing structure 70 is configured to inform the user that at least one of the first and second cylinders 14 and 16 reaches the reference position P3, it can be easy for the rider to adjust the seat position by reference to the reference position P3 during riding the bicycle.

Second Embodiment

A bicycle seatpost assembly 212 in accordance with a second embodiment will be described below referring to FIGS. 8 and 9. The bicycle seatpost assembly 212 has the same configuration as the bicycle seatpost assembly 12 except for the mechanical position informing structure. Thus, elements having substantially the same function as those in the first embodiment will be numbered the same here, and will not be described again in detail here for the sake of brevity.

Figure 8:
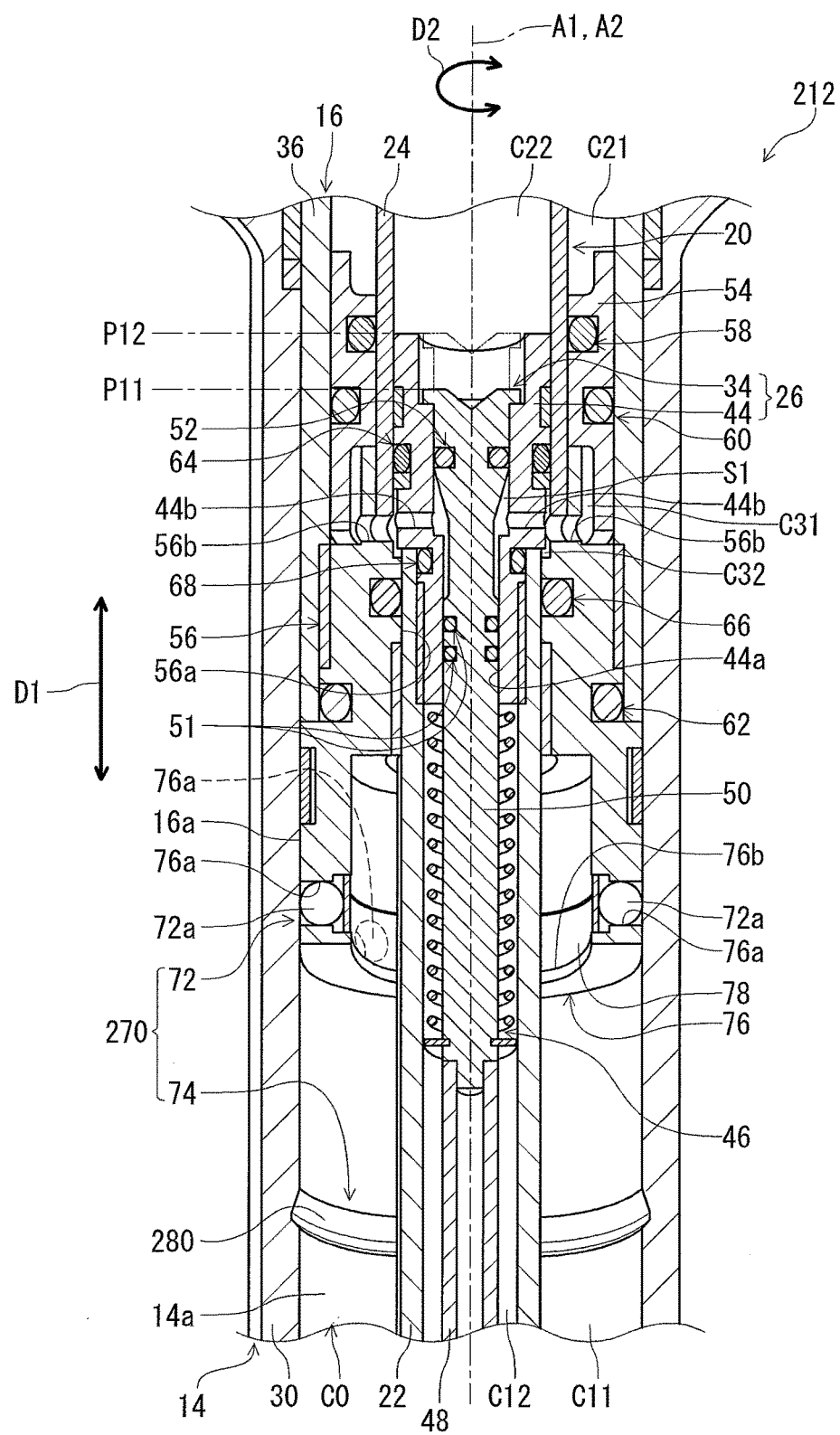
FIG. 8 is a partial enlarged cross-sectional view of a bicycle seatpost assembly in accordance with a second embodiment (a maximum-length position)

As seen in FIG. 8, the shape of the recess is not limited to the recess 74a in accordance with the first embodiment. The shape of the recess can be asymmetric in the axial direction D1. More specifically, the bicycle seatpost assembly 212 comprises a mechanical position informing structure 270 configured to inform a user that at least one of the first and second cylinders 14 and 16 reaches the reference position P3. The mechanical position informing structure 270 includes the first informing portion 72 and the second informing portion 74. The second informing portion 74 comprises a recess 280 with which the first informing portion 72 elastically pressed by the pressing member 78 mates when at least one of the first and second cylinders 14 and 16 reaches the reference position. The recess 280 is disposed on the inner peripheral surface 14a of the first cylinder 14.

Figure 9:
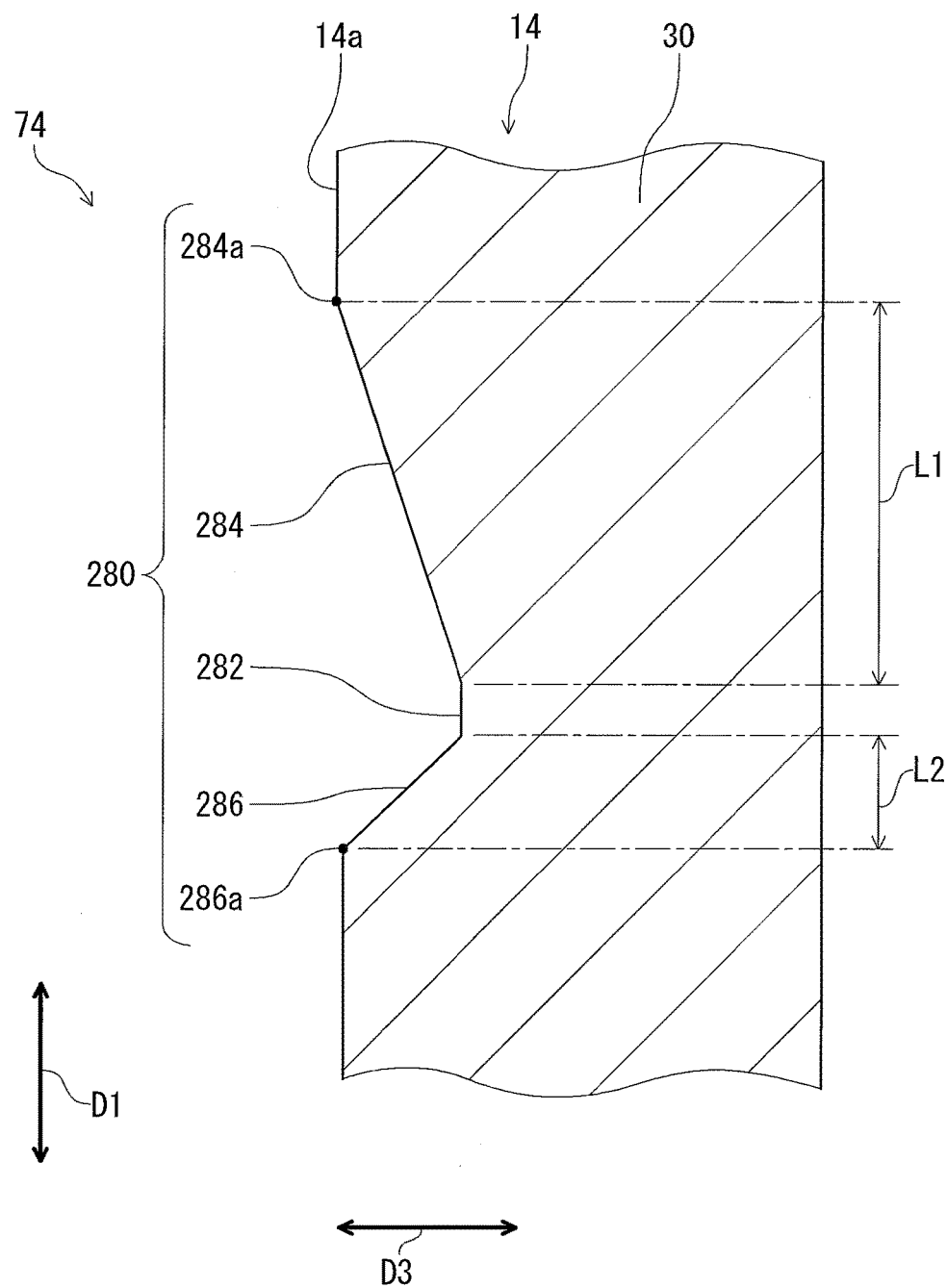
FIG. 9 is a partial enlarged cross-sectional view of the bicycle seatpost assembly illustrated in FIG. 8.

As seen in FIG. 9, the recess 280 includes a bottom portion 282, a first surface 284, and a second surface 286. The bottom portion 282 is disposed at a farthest position in the recess 280 from the inner peripheral surface 14a of the first cylinder 14 in a radial direction D3 of the first cylinder 14. The first surface 284 is provided closer to the seat attachment portion 18 than the bottom portion 282 in the axial direction D1. The second surface 286 is provided farther from the seat attachment portion 18 than the first surface 284 in the axial direction D1. At least one of the first surface 284 and the second surface 286 is inclined with respect to the axial direction D1.

As seen in FIG. 9, the first surface 284 has a first end 284a farthest from the bottom portion 282 in the first surface 284. The second surface 286 has a second end 286a farthest from the bottom portion 282 in the second surface 286. A distance L1 between the bottom portion 282 and the first end 284a of the first surface 284 in the axial direction D1 is longer than a distance L2 between the bottom portion 282 and the second end 286a of the second surface 286 in the axial direction D1. An inclination of the second surface 286 with respect to the axial direction D1 is steeper than an inclination of the first surface 284 with respect to the axial direction D1. In the illustrated embodiment, each of the first surface 284 and the second surface 286 is flat; however, at least one of the first surface 284 and the second surface 286 can at least partially have a curved shape.

With the bicycle seatpost assembly 212, since the mechanical position informing structure 270 is configured to inform a user that at least one of the first and second cylinders 14 and 16 reaches the reference position P3, the user can recognize that at least one of the first and second cylinders 14 and 16 reaches the reference position P3. Accordingly, it is possible to adjust the seat position by reference to the reference position P3.

Third Embodiment

A bicycle seatpost assembly 312 in accordance with a third embodiment will be described below referring to FIGS. 10 and 11. The bicycle seatpost assembly 312 has the same configuration as the bicycle seatpost assembly 12 except for the mechanical position informing structure. Thus, elements having substantially the same function as those in the above embodiments will be numbered the same here, and will not be described again in detail here for the sake of brevity.

Figure 10:
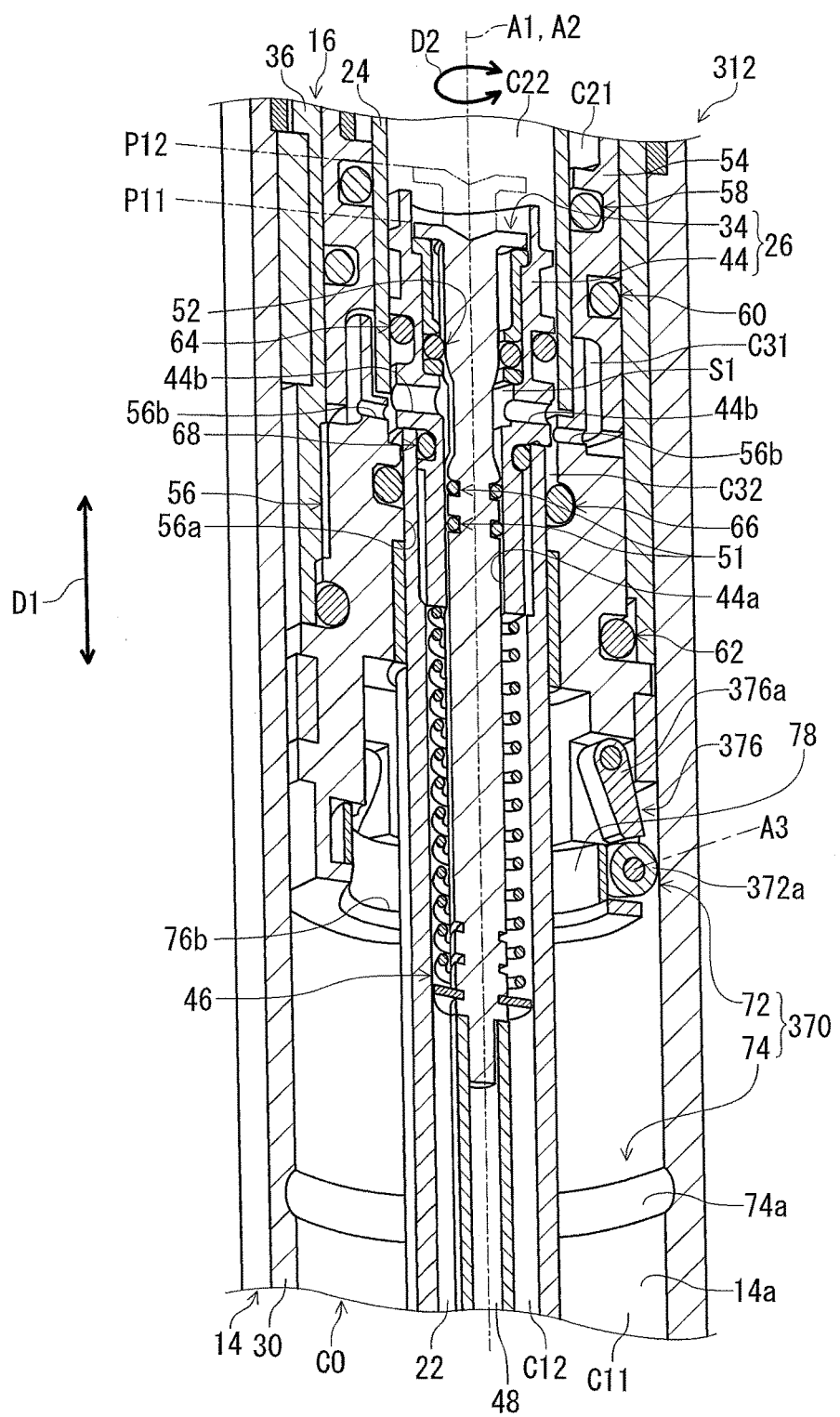
FIG. 10 is a partial enlarged cross-sectional view of a bicycle seatpost assembly in accordance with a third embodiment (a maximum-length position)

As seen in FIG. 10, the bicycle seatpost assembly 312 comprises a mechanical position informing structure 370. The mechanical position informing structure 370 includes the first informing portion 72 and the second informing portion 74. The first informing portion 72 comprises a rolling element rotatably provided with respect to the first and second cylinders 14 and 16. The first informing portion 72 comprises rolling elements 372a rotatably provided with respect to the first and second cylinders 14 and 16. In the illustrated embodiment, the rolling elements 372a are rollers each having a rotational axis A3 substantially perpendicular to the first center axis A1.

Figure 11:
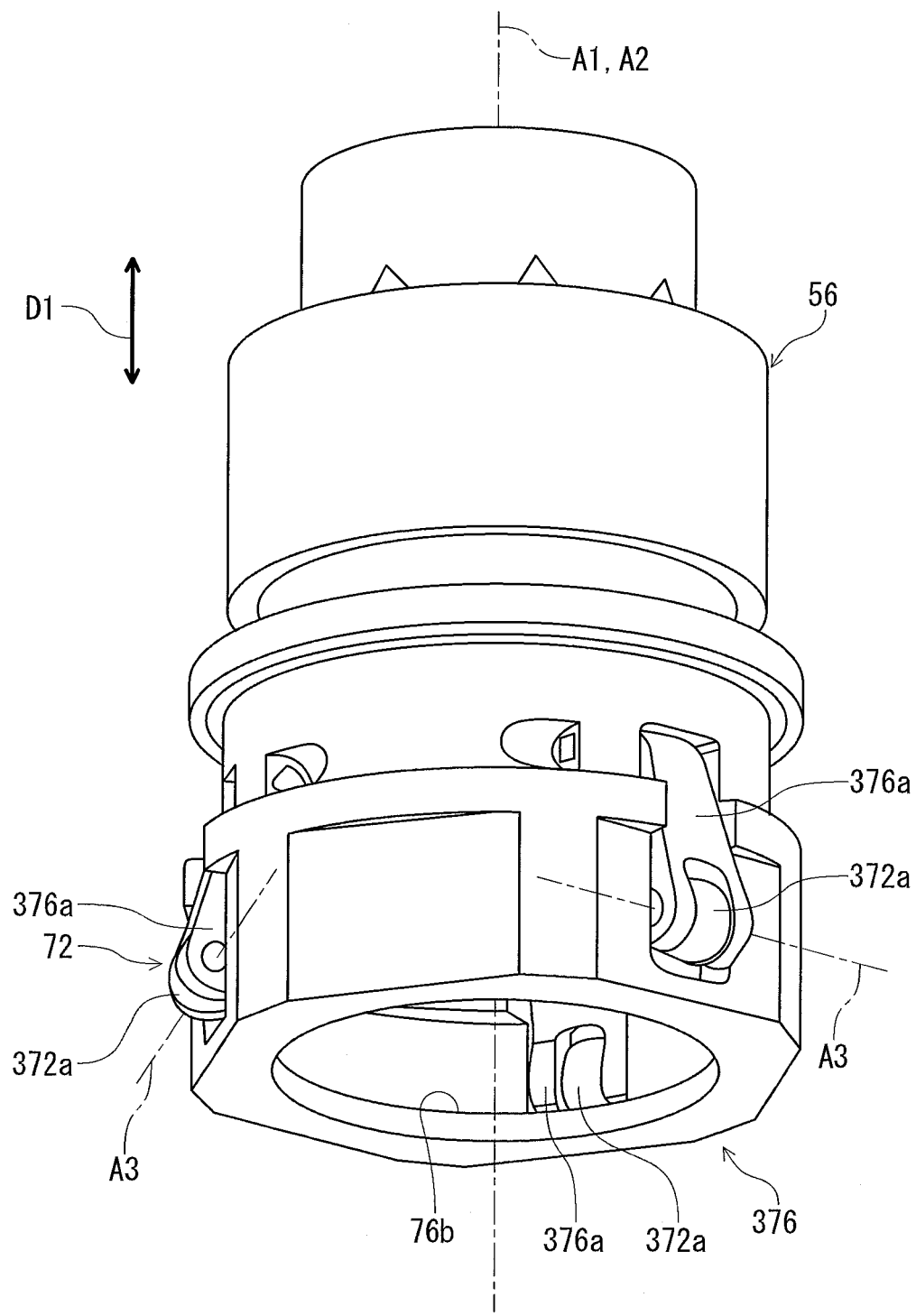
FIG. 11 is a perspective view of a sealing structure of the bicycle seatpost assembly illustrated in FIG. 10.

As seen in FIGS. 10 and 11, the second cylinder 16 includes a holding structure 376 configured to rotatably hold the rolling elements 372a. The holding structure 376 includes holding portions 376a each configured to rotatably hold the rolling elements 372a. Each of the holding portions 376a is pivotally coupled to the sealing structure 56. The pressing member 78 elastically presses the rolling elements 372a in a radially outward direction of the first cylinder 14.

With the bicycle seatpost assembly 312, since the mechanical position informing structure 370 is configured to inform a user that at least one of the first and second cylinders 14 and 16 reaches the reference position P3, the user can recognize that at least one of the first and second cylinders 14 and 16 reaches the reference position P3. Accordingly, it is possible to adjust the seat position by reference to the reference position P3.

Since the rolling elements 372a roll on the inner peripheral surface 14a of the first cylinder 14 in response to relative movement between the first cylinder 14 and the second cylinder 16, it is possible to reduce sliding resistance generated between the first cylinder 14 and the first informing portion 72.

Fourth Embodiment

A bicycle seatpost assembly 412 in accordance with a fourth embodiment will be described below referring to FIG. 12. The bicycle seatpost assembly 412 has the same configuration as the bicycle seatpost assembly 12 except for the mechanical position informing structure. Thus, elements having substantially the same function as those in the above embodiments will be numbered the same here, and will not be described again in detail here for the sake of brevity.

Figure 12:
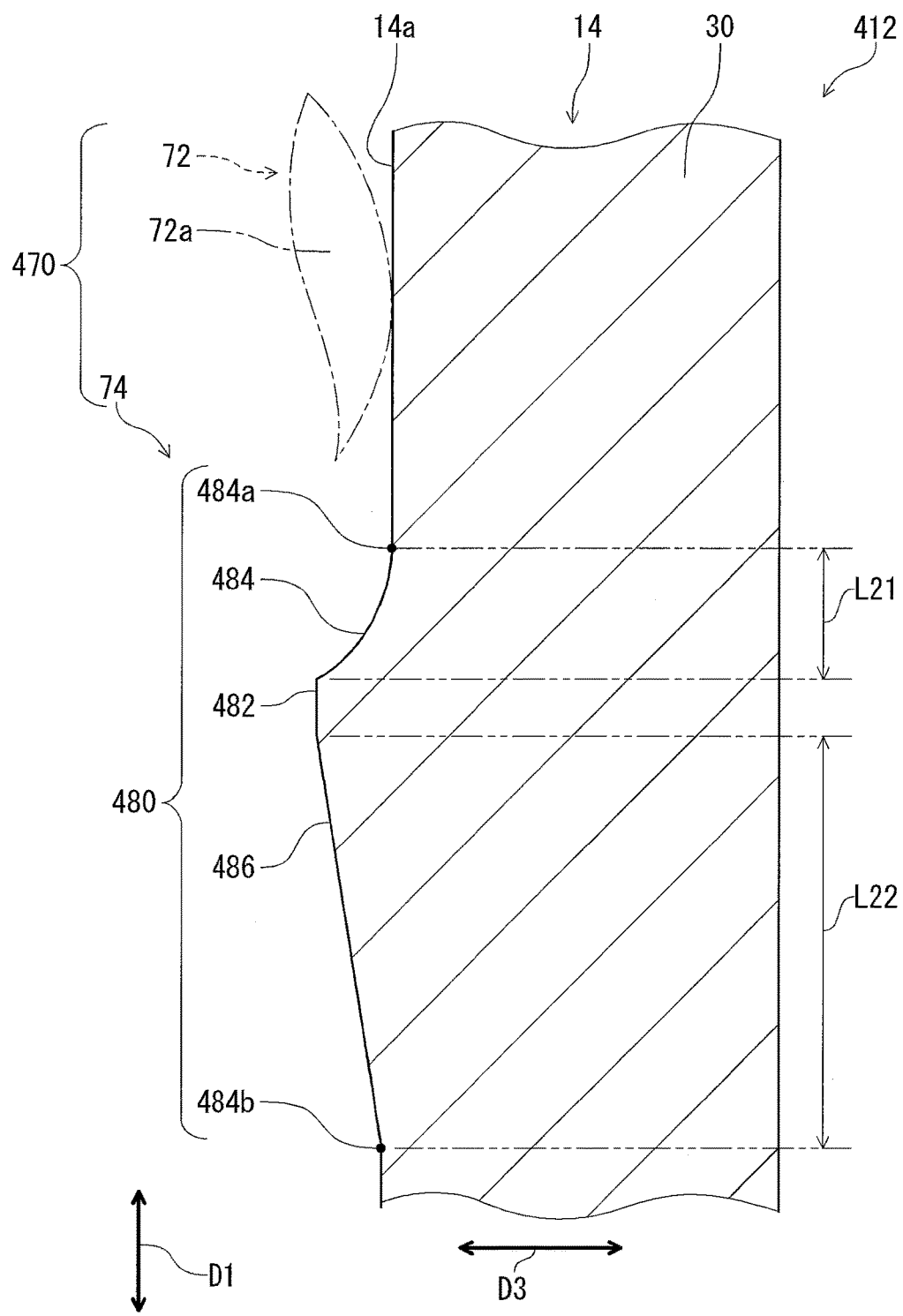
FIG. 12 is a partial enlarged cross-sectional view of a bicycle seatpost assembly in accordance with a fourth embodiment.

As seen in FIG. 12, the bicycle seatpost assembly 412 comprises a mechanical position informing structure 470. The mechanical position informing structure 470 includes the first informing portion 72 and the second informing portion 74. One of the first and the second informing portions 72 and 74 comprises a rolling element rotatably provided with respect to the first and second cylinders 14 and 16. In the illustrated embodiment, the first informing portion 72 comprises the rolling elements 72a. The other of the first and second informing portions 72 and 74 comprises a protrusion configured to be slidable with the one of the first and second informing portions 72 and 74 elastically pressed by the pressing member 78. In the illustrated embodiment, the second informing portion 74 comprises a protrusion 480 configured to be slidable with the first informing portion 72 elastically pressed by the pressing member 78.

As seen in FIG. 12, the protrusion 480 is disposed on the inner peripheral surface 14a of the first cylinder 14. The protrusion 480 includes a top portion 482, a first surface 484, and a second surface 486. The top portion 482 is disposed at a farthest position in the protrusion 480 from the inner peripheral surface 14a of the first cylinder 14 in a radial direction of the first cylinder 14. The first surface 484 is provided closer to the seat attachment portion 18 than the top portion 482 in the axial direction D1. The second surface 486 is provided farther from the seat attachment portion 18 than the first surface 484 in the axial direction D1. At least one of the first surface 484 and the second surface 486 is inclined with respect to the axial direction D1. The first surface 484 has a first end 484a farthest from the top portion 482 in the first surface 484. The second surface 486 has a second end 486a farthest from the top portion 482 in the second surface 486. A distance L21 between the top portion 482 and the first end 484a of the first surface 484 in the axial direction D1 is shorter than a distance L22 between the top portion 482 and the second end 486a of the second surface 486 in the axial direction D1. In the illustrated embodiment, the first surface 484 has a curved shape and has a radius of curvature substantially the same as the radius of each of the rolling elements 72a; however, the first surface 484 can at least partially be flat. The second surface 486 can at least partially have a curved shape as well as the first surface 484.

With the bicycle seatpost assembly 412, since the mechanical position informing structure 470 is configured to inform a user that at least one of the first and second cylinders 14 and 16 reaches the reference position P3, the user can recognize that at least one of the first and second cylinders 14 and 16 reaches the reference position P3. Accordingly, it is possible to adjust the seat position by reference to the reference position P3.

Since an inner diameter of the first cylinder 14 can be enlarged at portions other than the protrusion 480, it is possible to reduce sliding resistance generated between the first cylinder 14 and the first informing portion 72 when the first informing portion 72 passes through the portions other than the protrusion 480.

Fifth Embodiment

A bicycle seatpost assembly 512 in accordance with a fifth embodiment will be described below referring to FIGS. 13 and 14. The bicycle seatpost assembly 512 has the same configuration as the bicycle seatpost assembly 12 except for the mechanical position informing structure. Thus, elements having substantially the same function as those in the above embodiments will be numbered the same here, and will not be described again in detail here for the sake of brevity.

Figure 13:
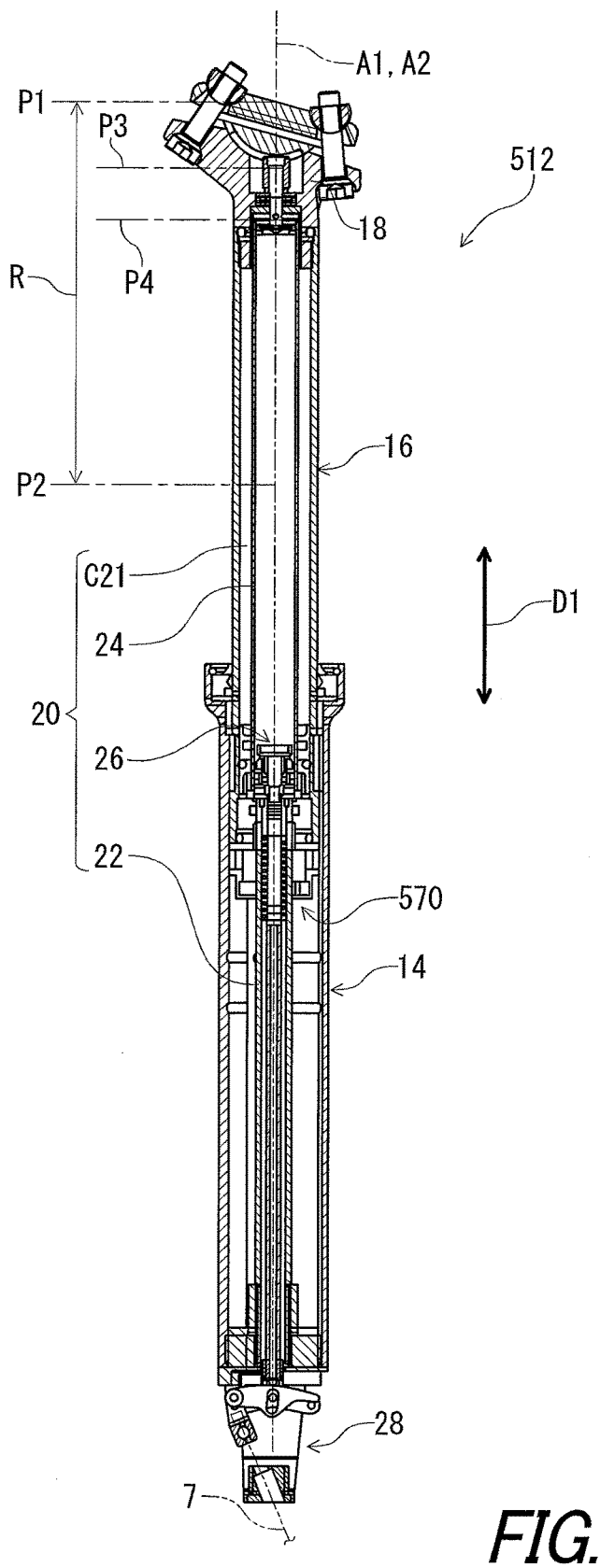
FIG. 13 is a cross-sectional view of a bicycle seatpost assembly in accordance with a fifth embodiment.

As seen in FIG. 13, the bicycle seatpost assembly 512 comprises a mechanical position informing structure 570. The mechanical position informing structure 570 is configured to inform a user that at least one of the first and second cylinders 14 and 16 reaches an additional reference position P4. The additional reference position P4 is defined between the maximum-length position P1 and the minimum-length position P2 and spaced apart from the reference position P3 in the axial direction D1.

Figure 14:
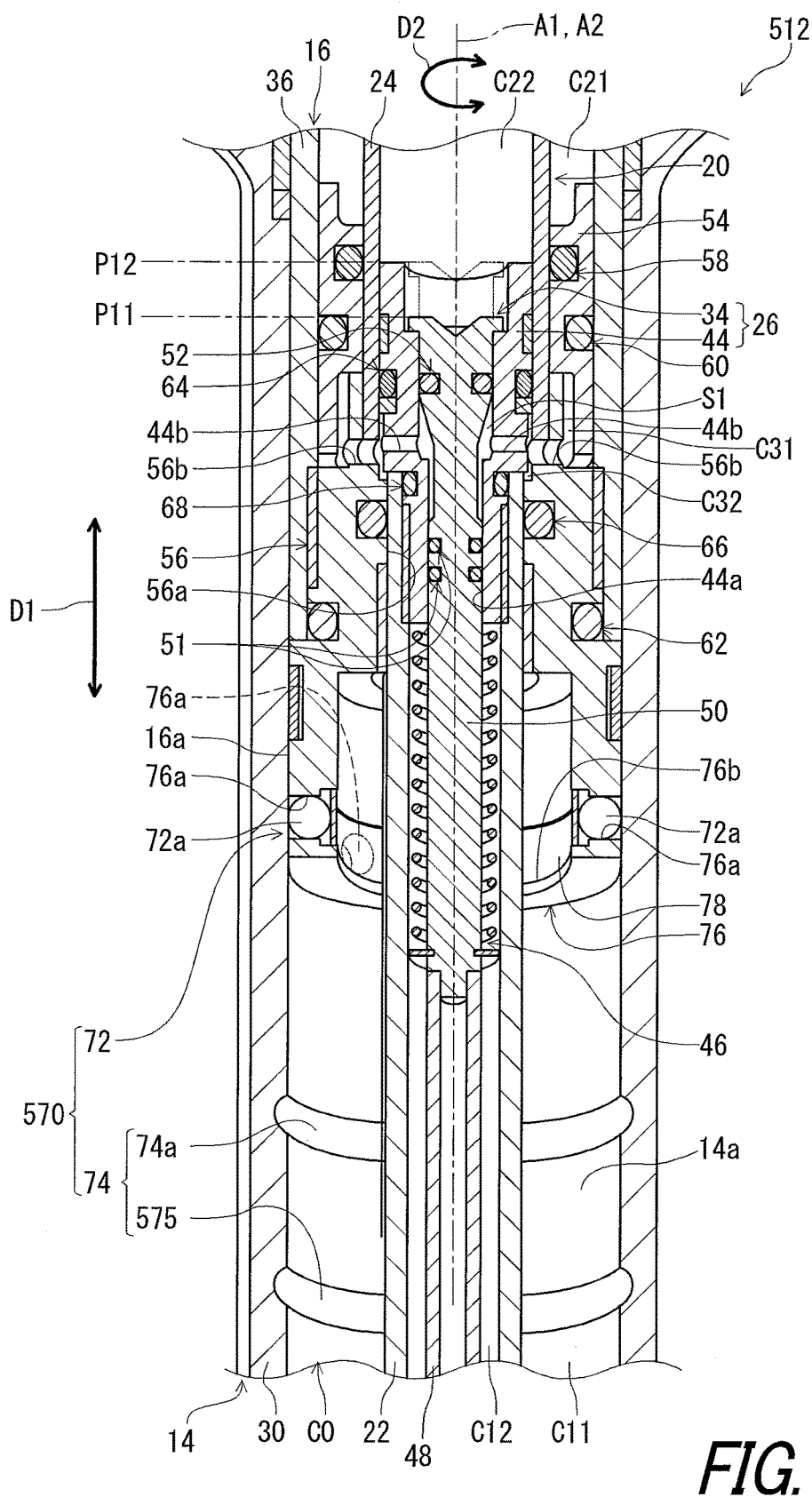
FIG. 14 is a partial enlarged cross-sectional view of the bicycle seatpost assembly illustrated in FIG. 13 (a maximum-length position).

As seen in FIG. 14, the mechanical position informing structure 570 comprises the first informing portion 72 and the second informing portion 74. The second informing portion 74 includes the recess 74a and an additional recess 575. The additional recess 575 is provided on the inner peripheral surface 14a of the first cylinder 14. The additional recess 575 is spaced apart from the recess 74a in the axial direction D1 and is disposed at a position corresponding to the additional reference position P4. Since the additional recess 575 has substantially the same shape as the recess 74a, it will not be described and/or illustrated in detail herein for the sake of brevity.

With the bicycle seatpost assembly 512, since the mechanical position informing structure 570 is configured to inform a user that at least one of the first and second cylinders 14 and 16 reaches the reference position P3 or the additional reference position P4, the user can recognize that at least one of the first and second cylinders 14 and 16 reaches the reference position P3 or the additional reference position P4. Accordingly, it is possible to adjust the seat position by reference to the reference position P3 and the additional reference position P4.

The structures of the above embodiments can be combined with each other. For example, the rolling elements 372a of the third embodiment can be applied to the bicycle seatpost assembly 212 in accordance with the second embodiment. The recess 280 of the second embodiment can be applied to the bicycle seatpost assembly 512 in accordance with the fifth embodiment.

In the above embodiments, the term "attached" or "attaching", as used herein, encompasses configurations in which an element directly attached to another element by affixing the element is directly to the other element; configurations in which the element is indirectly attached to the other element via the intermediate member(s); and configurations in which one element is integral with another element, i.e. one element is essentially part of the other element. This concept also applies to words of similar meaning, for example, "joined", "connected", "coupled", "mounted", "bonded", "fixed" and their derivatives.

The term "comprising" and its derivatives, as used herein, are intended to be open ended terms that specify the presence of the stated features, elements, components, groups, integers, and/or steps, but do not exclude the presence of other unstated features, elements, components, groups, integers and/or steps. This concept also applies to words of similar meaning, for example, the terms "have", "include" and their derivatives.

The terms "member", "section", "portion", "part" and "element" when used in the singular can have the dual meaning of a single part or a plurality of parts.

The ordinal numbers such as the terms "first" and "second" recited in the present application are merely identifiers, but do not have any other meanings, for example, a particular order and the like. Moreover, for example, the term "first element" itself does not imply an existence of "second element", and the term "second element" itself does not imply an existence of "first element."

Finally, terms of degree such as "substantially", "about" and "approximately" as used herein mean a reasonable amount of deviation of the modified term such that the end result is not significantly changed.

Obviously, numerous modifications and variations of the present invention are possible in light of the above teachings. It is therefore to be understood that within the scope of the appended claims, the invention may be practiced otherwise than as specifically described herein.

What is claimed is:

1. A bicycle seatpost assembly comprising:
   a first cylinder;
   a second cylinder configured to be telescopically received in the first cylinder along an axis of the first cylinder;
   a positioning structure configured to relatively position the first cylinder and the second cylinder, the positioning structure including a base member and a valve member, the valve member being movable relative to the base member in the axis of the first cylinder between a closed position and an open position such that a positional relationship between the first cylinder and the second cylinder is continuously adjustable within an adjustable position range of the bicycle seatpost assembly in a state where the valve member is disposed at the open position; and
   a mechanical position informing structure configured to inform a user that at least one of the first and second cylinders reaches a reference position, the reference position being defined between a maximum-length position and a minimum-length position of the adjustable position range,
   wherein the mechanical position informing structure includes:
      a first informing portion including a contact element provided on one of the first cylinder and the second cylinder; and
      a second informing portion including a recess or a protrusion provided on the other of the first cylinder and the second cylinder, wherein contact between the contact element and the recess or the protrusion during relative positioning of the first cylinder and the second cylinder informs the user that the at least one of the first and second cylinders has reached the reference position.

2. The bicycle seatpost assembly according to claim 1, wherein
   the mechanical position informing structure is configured to generate a physical notification to inform a user that at least one of the first and second cylinders reaches the reference position.

3. The bicycle seatpost assembly according to claim 2, wherein
   the mechanical position informing structure is configured to generate, as the physical notification, at least one of
      a change in resistance force against telescopic movement of the first cylinder and the second cylinder, and
      vibration in response to telescopic movement of the first cylinder and the second cylinder.

4. The bicycle seatpost assembly according to claim 3, wherein
   the positioning structure includes a biasing structure to generate a biasing force such that the first cylinder and the second cylinder are telescopically moved relative to each other.

5. The bicycle seatpost assembly according to claim 4, wherein
   the biasing structure includes a biasing chamber configured to be filled with a compressible fluid to generate the biasing force such that the first cylinder and the second cylinder are telescopically moved relative to each other.

6. The bicycle seatpost assembly according to claim 4, wherein
   the mechanical position informing structure is configured to generate the resistance force smaller than the biasing force not to prevent the first cylinder and the second cylinder from being telescopically moved relative to each other by the biasing force.

7. The bicycle seatpost assembly according to claim 3, wherein
   the first cylinder includes an inner peripheral surface defining an internal cavity in which the second cylinder is telescopically movable,
   the first informing portion is provided on an outer peripheral surface of the second cylinder in the internal cavity, and
   the second informing portion is provided on the inner peripheral surface of the first cylinder, the first informing portion and the second informing portion being slidable with each other to generate at least one of the change in resistance force and the vibration.

8. The bicycle seatpost assembly according to claim 7, wherein
   the mechanical position informing structure includes a pressing member configured to elastically press the first informing portion in a radial direction of the first cylinder.

9. The bicycle seatpost assembly according to claim 8, wherein
   the pressing member comprises a spring.

10. The bicycle seatpost assembly according to claim 8, wherein
    the contact element is a rolling element rotatably provided with respect to the first and second cylinders.

11. The bicycle seatpost assembly according to claim 10, wherein
    the second cylinder includes a holding structure configured to removably hold the rolling element.

12. The bicycle seatpost assembly according to claim 11, wherein
    the holding structure includes holding portions each configured to removably hold the rolling element.

13. The bicycle seatpost assembly according to claim 8, wherein
    the second informing portion comprises the recess with which the first informing portion elastically pressed by the pressing member mates when at least one of the first and second cylinders reaches the reference position.

14. The bicycle seatpost assembly according to claim 13, wherein
    the recess comprises a groove extending in a circumferential direction of the first cylinder.

15. The bicycle seatpost assembly according to claim 13, wherein
    one of the first and second cylinders includes a seat attachment portion to which a bicycle seat is to be attached, the second cylinder is configured to be telescopically movable relative to the first cylinder in an axial direction of the first cylinder, the recess is disposed on the inner peripheral surface of the first cylinder, the recess including
- a bottom portion disposed at a farthest position in the recess from the inner peripheral surface of the first cylinder in a radial direction of the first cylinder,
- a first surface provided closer to the seat attachment portion than the bottom portion in the axial direction, and
- a second surface provided farther from the seat attachment portion than the first surface in the axial direction, and at least one of the first surface and the second surface is inclined with respect to the axial direction.

16. The bicycle seatpost assembly according to claim 15, wherein the first surface has a first end farthest from the bottom portion in the first surface, the second surface has a second end farthest from the bottom portion in the second surface, and a distance between the bottom portion and the first end of the first surface in the axial direction is longer than a distance between the bottom portion and the second end of the second surface in the axial direction.

17. The bicycle seatpost assembly according to claim 8, wherein the second informing portion comprises the protrusion configured to be slidable with the the first informing portion elastically pressed by the pressing member.

18. The bicycle seatpost assembly according to claim 17, wherein one of the first and second cylinders includes a seat attachment portion to which a bicycle seat is to be attached, the second cylinder is configured to be telescopically movable relative to the first cylinder in an axial direction of the first cylinder, the protrusion is disposed on the inner peripheral surface of the first cylinder, the protrusion including
- a top portion disposed at a farthest position in the protrusion from the inner peripheral surface of the first cylinder in a radial direction of the first cylinder,
- a first surface provided closer to the seat attachment portion than the top portion in the axial direction, and
- a second surface provided farther from the seat attachment portion than the first surface in the axial direction, and at least one of the first surface and the second surface is inclined with respect to the axial direction.

19. The bicycle seatpost assembly according to claim 18, wherein the first surface has a first end farthest from the top portion in the first surface, the second surface has a second end farthest from the top portion in the second surface, and a distance between the top portion and the first end of the first surface in the axial direction is shorter than a distance between the top portion and the second end of the second surface in the axial direction.

20. The bicycle seatpost assembly according to claim 1, wherein one of the first and second cylinders is configured to be telescopically movable relative to each other, the mechanical position informing structure is configured to inform a user that at least one of the first and second cylinders reaches an additional reference position, and the additional reference position is defined between the maximum-length position and the minimum-length position and spaced apart from the reference position in the axial direction.

21. The bicycle seatpost assembly according to claim 1, wherein the contact element has a symmetrical shape about a plane extending orthogonal to the axis.

* * * * *